Figure 1:
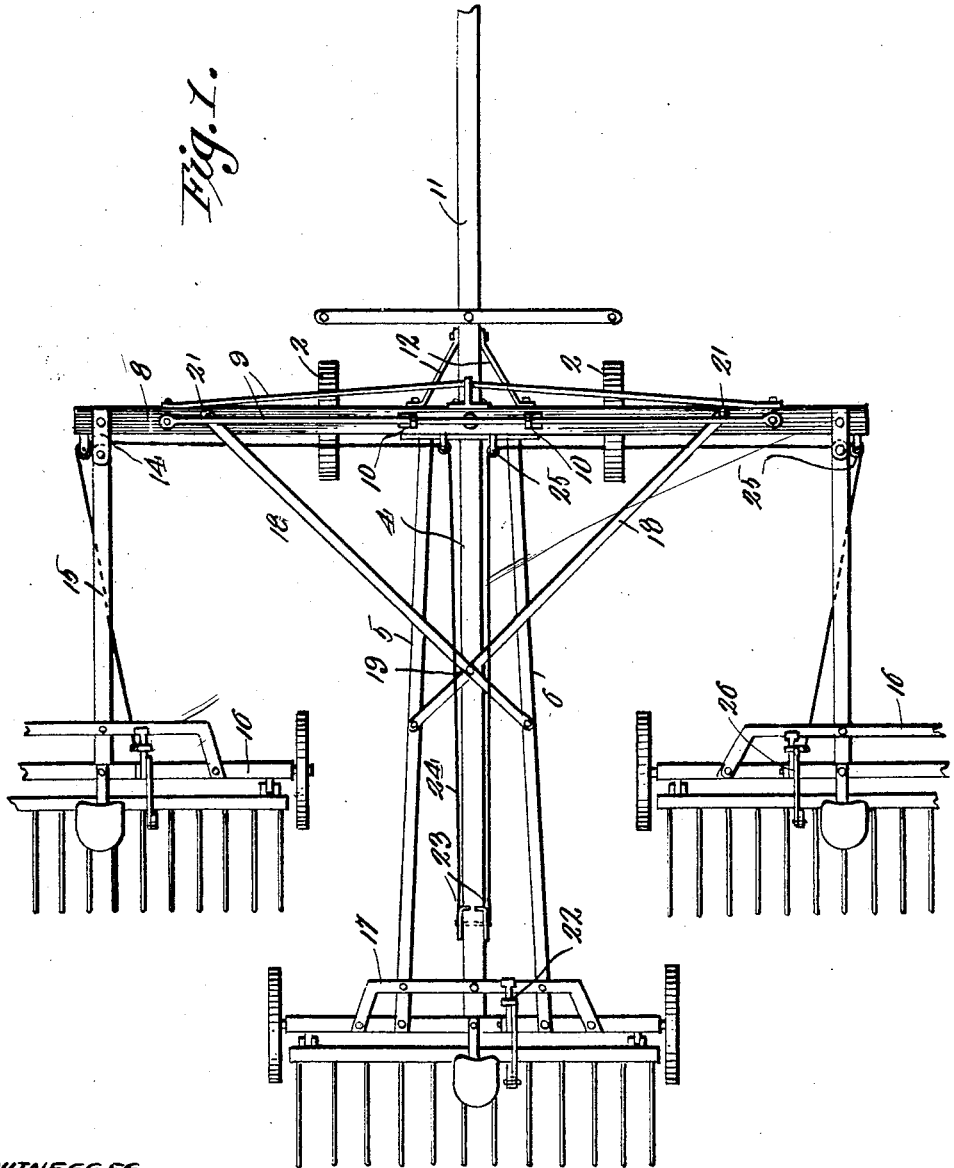

Sept. 3, 1929.　　　L. R. SANDALL　　　1,726,860
DRAFT DEVICE
Filed Feb. 27, 1923　　　2 Sheets-Sheet 1

WITNESSES

INVENTOR
LLOYD R. SANDALL

Sept. 3, 1929.  L. R. SANDALL  1,726,860
DRAFT DEVICE
Filed Feb. 27, 1928  2 Sheets-Sheet 2
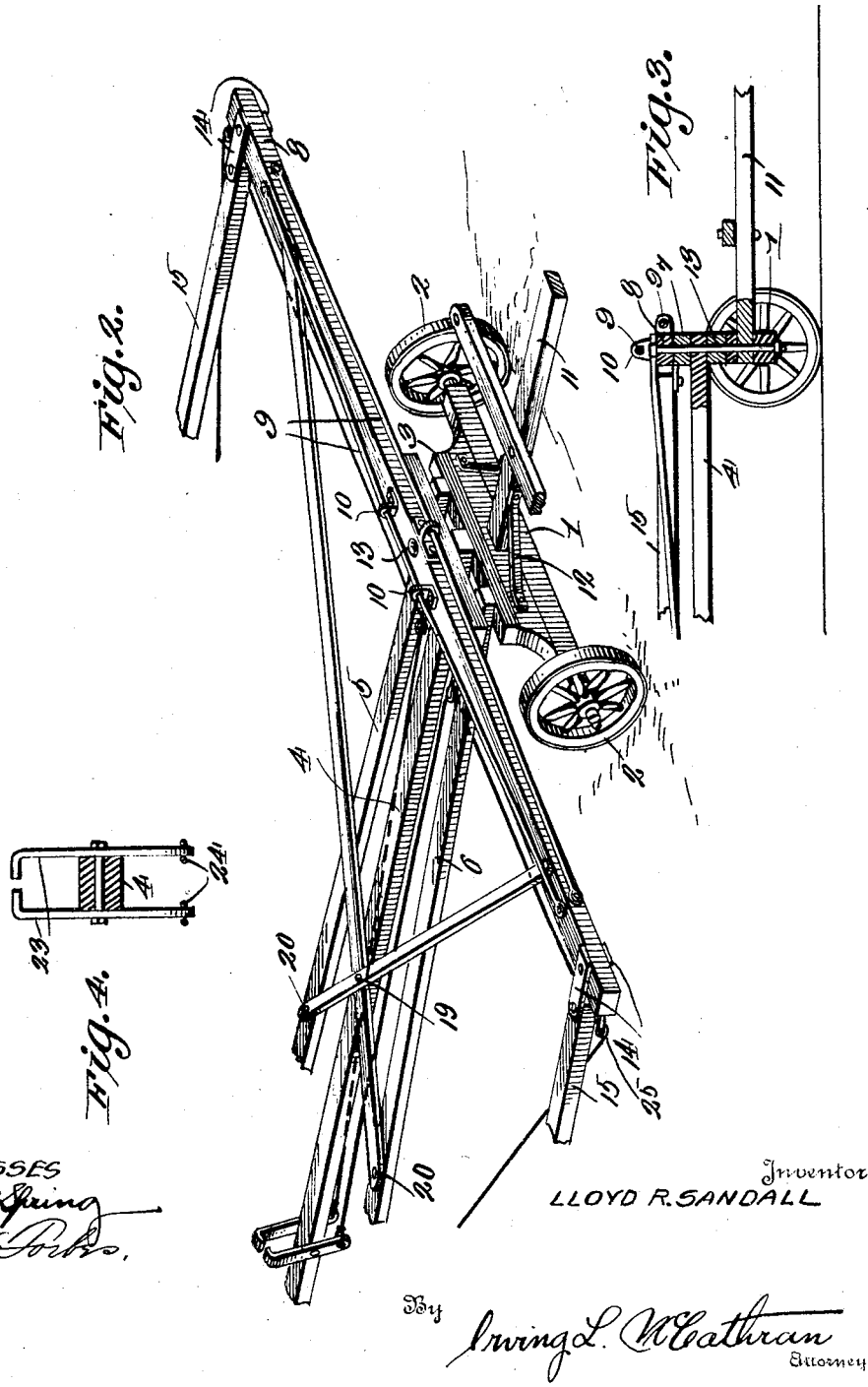
WITNESSES
Inventor
LLOYD R. SANDALL
By
Attorney Patented Sept. 3, 1929.

1,726,860

UNITED STATES PATENT OFFICE.

LLOYD R. SANDALL, OF BASSETT, NEBRASKA.

DRAFT DEVICE.

Application filed February 27, 1928. Serial No. 257,461.

This invention relates to the class of land vehicles and pertains particularly to an improved type of hitch for connecting together a plurality of vehicles for simultaneous movement.

The primary object of this invention is to provide in a manner as hereinafter set forth, an improved type of hitch wherein a number of wheeled devices can be connected together to be drawn and controlled by a single source of power such as a tractor, single horse or a team of horses.

Another object of the invention is to provide, in a manner as hereinafter set forth, a draft hitch wherein the parts are strongly and securely connected together but adapted to be quickly and conveniently connected or disconnected as the occasion requires.

Numerous other objects and advantages of the present invention will become apparent as the description of the same proceeds and the invention will be best understood from a consideration of the following detailed description taken in connection with the accompanying drawings forming a part of the present specification, with the understanding, however, that the invention is not confined to any strict conformity with the showing of the drawings but may be changed or modified so long as such changes or modifications mark no material departure from the salient features of the invention as expressed in the appended claims.

In the drawings:
Figure 1 shows the draft hitch embodying the present invention in top plan view.

Figure 2 is a perspective view of the hitch structure looking from one side of the front.
Figure 3 is a vertical longitudinal section through the supporting bolster and the beams carried thereby showing the manner in which the king pin maintains certain of the beams in position.
Figure 4 is a detailed sectional view taken transversely of the center rear tongue adjacent and looking toward the pair of foot controlled levers.

Referring now to the drawings in detail wherein like numerals of reference indicate corresponding parts throughout the several views, the numeral 1 indicates an axle carrying upon each end a supporting wheel 2. A sub bolster 3 is mounted upon the axle 1 and resting upon the top of this sub-bolster is one end of each of three rearwardly directed tongues indicated by the numerals 4, 5 and 6. As shown the tongue 4 is positioned between the tongues 5 and 6 and extends in a direction at substantially right angles to the axle and the sub bolster while the tongues 5 and 6 which might be termed brace members are arranged in divergent relation rearwardly of the supporting axle and bolster.

Overlying the ends of the tongues 4, 5 and 6 is a bolster body 7 which extends substantially parallel to the axle and the subbolster and overlying and extending longitudinally of the bolster 7 is a main draw beam 8 the ends of which extend a substantial distance beyond the ends of the bolster as shown. As is also shown the main draw beam 8 is relatively long and extends a substantial distance at each end beyond the supporting wheels of the truck structure which constitutes the axle 1 and wheels 2.

Suitable brace rods or cables 9 extend longitudinally of the main beam 8 as shown, the ends of the rods or cables 9 being secured adjacent the ends of the beam while the intermediate portions are supported by and extend through brackets 10. If desired suitable means may be provided for drawing the brace rods or cables 9 taut, such as for example by the use of turn-buckles or the like (not shown). The axle 1 has mounted therein intermediate the ends thereof the rear end of the draft tongue 11, suitable hounds 12 being provided to brace the tongues against the axle as shown.

The structure embodying the elements 1, 3, 4, 8 and 11 is held together by a main or king bolt 13, which, as shown in Figure 3, passes downwardly through all of these elements.

At each end of the beam 8 there is secured a pair of spaced bracket plates 14 which project rearwardly of the beam in spaced relation as shown in Figure 2. Between the plates of each pair there is pivotally mounted one end of a lateral tongue 15 which extends rearwardly of the hitch device normally substantially parallel with the center rear tongue 4.

Each of the lateral rearwardly extending tongues 15 is designed to have an implement attached to the rear end thereof as for example the hay-rake 16 and a similar implement is to be connected to the rear end of the center tongue and to the brace members which are positioned between the lateral tongue 15 and as shown in Figure 1 extend rearwardly a substantial distance beyond the lateral tongues. The central implement which is also here shown as a hay rake is indicated by the numeral 17.

The central rearwardly extending tongue 4 and the brace members 5 and 6 are braced and maintained in position by the brace bars 18 which bars are arranged in crossed relation adjacent their rear ends the point at which they cross being secured to the tongue 4 as indicated at 19 while their rear ends are connected as at 20 to the brace members. The forward ends of the brace bars 18 are secured as at 21 to the main beam 8 adjacent one end thereof.

In order that the three implements as for example the three rakes here shown, may be controlled by one attendant riding upon the central rake 17, there is provided in addition to the control element 22 which is connected only with the center rake 17, the pair of foot pedals 23 mounted adjacent the rear end of the center tongue 4 upon opposite sides thereof as shown. Each of these foot pedals 23 is connected by a cable 24 which extends forwardly to the beam 8 and over the pulleys 25 carried thereby, to the control element 26 of one of the lateral rakes 16. In this manner it will be readily understood that upon pressing downwardly upon one of the foot levers 23 the lower end of each will be swung toward the rear of the structure thus pulling upon the cable 24 attached thereto, this pulling operation resulting in the lifting of the rake to which the cable is connected.

From the foregoing description it will be readily seen that the present draft hitch is of simple but strong and durable construction, has few moving parts to get out of order and can be readily adjusted for various working conditions. When it is desired to pass the hitch device through a gate way or other restricted area the tongues 15 can be disconnected from the ends of the beam 8, the brace beams 18 disconnected at their forward ends and the main beam swung to a position parallel with the draft tongue 11 and rearwardly extending tongue 4.

Having thus described my invention what I claim is:

1. A multiple hitch draft device, comprising a wheeled structure, a draft tongue extending forwardly from said structure, a centrally arranged rear draft tongue connected to said structure, a relatively long draft beam extending transversely of the structure a substantial distance beyond each side thereof, brace elements extending from said draft beam to said center rear tongue, and laterally positioned rearwardly directed tongues pivotally connected one to each end of said main beam for connection with an implement.

2. A multiple draft hitch comprising a wheeled truck including a bolster pivotally mounted thereon, a rearwardly extending draft tongue pivotally connected between the bolster and the truck, brace members connected to said truck and extending rearwardly one on each side of the draft tongue, a main draft beam extending transversely of the truck substantially parallel with said bolster and resting thereon, lateral draft tongues each connected to one end of said main beam, crossed bracing arms connecting said main beam adjacent the outer ends thereof with said central tongue and said brace members, and a forwardly extending draft tongue connected to said truck.

3. A multiple hitch device for land vehicles, comprising a wheel truck, an implement draft tongue pivotally connected at one end to said truck and extending rearwardly thereof, a brace member upon each side of said draft tongue having one end connected to the truck and extending therefrom in divergent relation to one another, a bolster mounted upon said tongue and brace members over said truck, a cross-beam mounted intermediate its ends upon said bolster and extending a substantial distance beyond each side of the truck, brace bars each having one end connected to said cross beam adjacent the outer ends thereof and extending across said tongue and the brace members and connected thereto, lateral rearwardly extending draft tongues each connected to one end of said cross beam, and a forwardly extending draft tongue carried by the truck for the connection of a draft device thereto.

4. A multiple hitch device for land vehicles, comprising a wheeled truck, an implement draft tongue pivotally connected at one end to said truck and extending rearwardly thereof, a brace member upon each side of said tongue having one end connected to the truck and extending therefrom in divergent relation to one another, a bolster mounted upon said tongue and brace members over said truck, a cross beam mounted intermediate its ends upon said bolster and extending a substantial distance beyond each side of the truck, brace bars each having one end connected to said cross beam adjacent the outer ends thereof and extending across said tongue and the brace members and connected thereto, lateral rearwardly extending draft tongues each connected to one end of said cross beam, a forwardly extending draft tongue carried by the truck for the connection of a draft device thereto, said cross beam, bolster, centrally positioned rearwardly extending tongues and truck being pivotally connected together to facilitate dissembling of the structure.

In testimony whereof I affix my signature.

LLOYD R. SANDALL.